United States Patent
Schmitt

(10) Patent No.: US 12,519,606 B2
(45) Date of Patent: Jan. 6, 2026

(54) SYSTEMS AND METHODS FOR SYNCHRONIZING TRANSMISSION RATES OF DATA HOSTS AND RADIO FREQUENCY TRANSMITTERS

(71) Applicant: The MITRE Corporation, McLean, VA (US)

(72) Inventor: Kenneth W. Schmitt, Woburn, MA (US)

(73) Assignee: The MITRE Corporation, McLean, VA (US)

( * ) Notice: Subject to any disclaimer, the term of this patent is extended or adjusted under 35 U.S.C. 154(b) by 34 days.

(21) Appl. No.: 18/735,834

(22) Filed: Jun. 6, 2024

(65) Prior Publication Data

US 2024/0413963 A1  Dec. 12, 2024

Related U.S. Application Data

(60) Provisional application No. 63/471,908, filed on Jun. 8, 2023.

(51) Int. Cl.
*H04L 7/00* (2006.01)

(52) U.S. Cl.
CPC .................................. *H04L 7/0012* (2013.01)

(58) Field of Classification Search
CPC ................ H04J 3/0667; H04L 7/0012; H04W 56/0015
See application file for complete search history.

(56) References Cited

U.S. PATENT DOCUMENTS

| | | | |
|---|---|---|---|
| 11,838,106 B2 * | 12/2023 | Li | H04J 3/0673 |
| 12,114,278 B2 * | 10/2024 | Aijaz | H04W 56/0005 |
| 2006/0233203 A1 * | 10/2006 | Iwamura | H04N 21/4305 |
| | | | 375/E7.278 |
| 2024/0214961 A1 * | 6/2024 | Newman | H04L 27/2692 |

* cited by examiner

*Primary Examiner* — Dac V Ha
(74) *Attorney, Agent, or Firm* — Morrison & Foerster LLP

(57) ABSTRACT

A method for synchronizing data transmission rates of a data host and a radio frequency (RF) transmitter comprises: transmitting a time request from the data host at a first time of a data host clock to the RF transmitter; receiving, by the data host, a time response from the RF transmitter comprising a first time of a RF transmitter clock associated with when the RF transmitter received the time request; generating, by the data host, an operating clock ratio between the data host clock and the RF transmitter clock based on the first time of the data host clock and the first time of the RF transmitter clock; generating, by the data host, an estimate of a second clock time of the RF transmitter clock based on the operating clock ratio; and transmitting data from the data host to the RF transmitter at a data transmission rate.

23 Claims, 10 Drawing Sheets

SYSTEMS AND METHODS FOR SYNCHRONIZING TRANSMISSION RATES OF DATA HOSTS AND RADIO FREQUENCY TRANSMITTERS

CROSS-REFERENCE TO RELATED APPLICATIONS

This application claims the benefit of U.S. Provisional Application No. 63/471,908, filed Jun. 8, 2023, the entire contents of which is incorporated herein by reference.

TECHNICAL FIELD

This disclosure generally relates to communication systems, and more specifically, to radio frequency communication systems.

BACKGROUND OF THE DISCLOSURE

Conventional analog radio frequency (RF) communication systems generally work by using carrier waves, which may be modulated in amplitude, frequency, or phase by dedicated hardware components to encode an analog signal. The modulated carrier wave may be transmitted and subsequently received, where it may be demodulated to extract the original analog signal. However, conventional analog systems have various deficiencies, such as being limited in terms of bandwidth, signal quality, and interference susceptibility. Digital RF Software Defined Radio (SDR) systems, which can include direct RF, super-heterodyne, zero intermediate frequency (IF), among others, use digital modulation techniques that directly modulate the RF carrier wave, which helps address various limitations of analog systems, such as allowing for more efficient use of available frequencies, enabling higher data rates, and improved signal quality. Digital RF SDR systems may be deployed in high bandwidth environments where large amounts of data transmission is needed.

Digital RF SDR systems include an RF transmitter that receives digital data from data hosts or data sources and converts that data to RF signals for transmission. Digital RF SDR transmitters are often implemented using a System on Chip or System in Package architecture. A System on Chip (SoC) and System in Package (SiP) architecture both often include one or more processing chips for executing instructions and performing various arithmetic or logical operations, a memory for storing data and instructions, input/output (IO) interfaces for communicating with external systems, and analog or digital signal processors to process signals from sensors and other input devices, among various others. However, SoC and SiP architectures may differ in that a SoC architecture may be an electronic system that is integrated onto a single integrated circuit, while a SiP architecture may be an electronic system with multiple integrated chips that are combined into a single package using various packaging techniques. Conventional RF transmitters may include one or more memory buffers for staging data for transmission. The one or more memory buffers may include on-chip memory that is integrated directly into one or more processor chips of the RF transmitter and off-chip memory that is connected to the one or more processors via one or more serial and/or parallel communication buses. The on-chip memory buffers may be readily accessed and allow for high data processing rates but capacity may be very limited and the memory resources may be costly. The off-chip memory buffers generally have much higher data storage capacity than the on-chip buffers, but are typically slower to access, resulting in slower data processing rates. Off-chip memory buffers are often utilized when the amount of data received by the RF transmitter from data hosts or data sources exceeds the rate at which data is transmitted by the RF transmitter and exceeds the capacity of the on-chip buffers. Off-chip memory buffers may also be required when conventional strategies are deployed for controlling the transmission rate. This is because conventional strategies may require the memory buffers to buffer the round trip network latency between the data hosts and the RF transmitters in addition to the network latency variability in high-bandwidth transmission environments.

SUMMARY OF THE DISCLOSURE

According to various embodiments, systems and methods include synchronizing the transmission rate of data from a data host to an RF transmitter to the data processing rate of the RF transmitter, which may in turn synchronize the transmission rates of the data host and the RF transmitter. The data host may obtain a clock time of the RF transmitter and transmit data to the RF transmitter based on the clock time of the RF transmitter. The process that the host uses to obtain the clock time of the RF transmitter may include transmitting a request to the RF transmitter for a clock time of the RF transmitter's clock, while keeping track of the clock time of its own clock associated with when the time request was transmitted. The RF transmitter may then respond to the time request with a time response that includes the requested clock time of its clock. The data host may then use the clock times to generate a clock ratio between the data host and RF transmitter's respective clocks. The data host may use the clock ratio to generate an estimate of the clock time of the RF transmitter's clock, and use that estimate of the clock time to adjust its transmission rate.

In various embodiments, a method for synchronizing data transmission rates of a data host and a radio frequency (RF) transmitter includes transmitting a time request from the data host at a first time of a data host clock to the RF transmitter. The method further includes receiving, by the data host, a time response from the RF transmitter comprising a first time of a RF transmitter clock associated with when the RF transmitter received the time request, wherein the time response is received by the data host at a second time of the data host clock. The method further includes generating, by the data host, an operating clock ratio between the data host clock and the RF transmitter clock based on the first time of the data host clock and the first time of the RF transmitter clock. The method further includes generating, by the data host, an estimate of a second clock time of the RF transmitter clock based on the operating clock ratio, and transmitting data from the data host to the RF transmitter at a data transmission rate, wherein the data transmission rate is based on the estimate of the second clock time of the RF transmitter clock.

Optionally, the operating clock ratio is generated based on at least two instances of the first time of the data host clock and at least two instances of the first time of the RF transmitter clock.

Optionally, the operating clock ratio is an average of multiple clock ratios, wherein each of the one or more clock ratios is computed based on at least one instance of the first time of the data host clock and at least one instance of the first time of the RF transmitter clock.

Optionally, the at least one instance of the first time of the data host clock and the at least one instance of the first time of the RF transmitter clock are obtained by repeating the steps of transmitting the time request and receiving the time response at a predetermined time interval.

Optionally, the RF transmitter stores a true clock time of the RF transmitter clock in memory.

Optionally, the true clock time of the RF transmitter clock is a count of a number of clock cycles of the RF transmitter clock.

Optionally, the RF transmitter includes a memory buffer for receiving the data transmitted from the data host.

Optionally, the memory buffer is integrated as part of one or more processors of the RF transmitter.

Optionally, the data host includes a thread executing on a processor for transmitting the time request, receiving the time response, and generating the estimate of the second clock time of the RF transmitter clock.

Optionally, generating the estimate of the second clock time of the RF transmitter clock is further based on the first time of the RF transmitter clock and the first time of the data host clock.

Optionally, the data host includes a central processing unit (CPU), a graphics processing unit (GPU), or a field-programmable gate array (FPGA).

Optionally, the RF transmitter includes a digital-to-analog converter, a network interface, or a combination thereof.

Optionally, the RF transmitter clock is a clock of the digital-to-analog converter.

Optionally, the RF transmitter includes a system in package (SiP), a system on chip (SoC), or a field-programmable gate array (FPGA).

Optionally, the data is transmitted from the data host to the RF transmitter via an ethernet connection.

Optionally, the ethernet connection is a 100 gigabit ethernet connection.

In various embodiments, a data host system for synchronizing data transmission rates with a radio frequency (RF) transmitter includes a data host clock, one or more processors, and a memory coupled to the one or more processors comprising instructions executable by the processors, the processors being operable when executing the instructions to transmit a time request at a first time of the data host clock to the RF transmitter. The processors being further operable when executing the instructions to receive a time response from the RF transmitter comprising a first time of a RF transmitter clock associated with when the RF transmitter received the time request, wherein the time response is received at a second time of the data host clock. The processors being further operable when executing the instructions to generate an operating clock ratio between the data host clock and the RF transmitter clock based on the first time of the data host clock and the first time of the RF transmitter clock. The processors being further operable when executing the instructions to generate an estimate of a second clock time of the RF transmitter clock based on the operating clock ratio, and transmit data to the RF transmitter at a data transmission rate, wherein the data transmission rate is based on the estimate of the second clock time of the RF transmitter clock.

Optionally, the operating clock ratio is generated based on at least two instances of the first time of the data host clock and at least two instances of the first time of the RF transmitter clock.

Optionally, the operating clock ratio is an average of one or more clock ratios, wherein each of the one or more clock ratios is computed based on at least one instance of the first time of the data host clock and at least one instance of the first time of the RF transmitter clock.

Optionally, the RF transmitter includes a memory buffer for receiving the data transmitted from the data host, wherein the memory buffer is integrated as part of one or more processors of the RF transmitter.

In various embodiments, one or more computer-readable non-transitory storage media embodies software for synchronizing data transmission rates of a data host and a radio frequency (RF) transmitter, the software including instructions operable when executed to transmit a time request from the data host at a first time of a data host clock to the RF transmitter. The software further includes instructions operable when executed to receive a time response from the RF transmitter comprising a first time of a RF transmitter clock associated with when the RF transmitter received the time request, wherein the time response is received at a second time of the data host clock. The software further includes instructions operable when executed to generate an operating clock ratio between the data host clock and the RF transmitter clock based on the first time of the data host clock and the first time of the RF transmitter clock. The software further includes instructions operable when executed to generate an estimate of a second clock time of the RF transmitter clock based on the operating clock ratio, and transmit data to the RF transmitter at a data transmission rate, wherein the data transmission rate is based on the estimate of the second clock time of the RF transmitter clock.

Optionally, the operating clock ratio is generated based on at least two instances of the first time of the data host clock and at least two instances of the first time of the RF transmitter clock.

Optionally, the operating clock ratio is an average of one or more clock ratios, wherein each of the one or more clock ratios is computed based on at least one instance of the first time of the data host clock and at least one instance of the first time of the RF transmitter clock.

BRIEF DESCRIPTION OF THE FIGURES

The invention will now be described, by way of example only, with reference to the accompanying drawings, in which.

DESCRIPTION OF EXAMPLE EMBODIMENTS

Figure 1A:
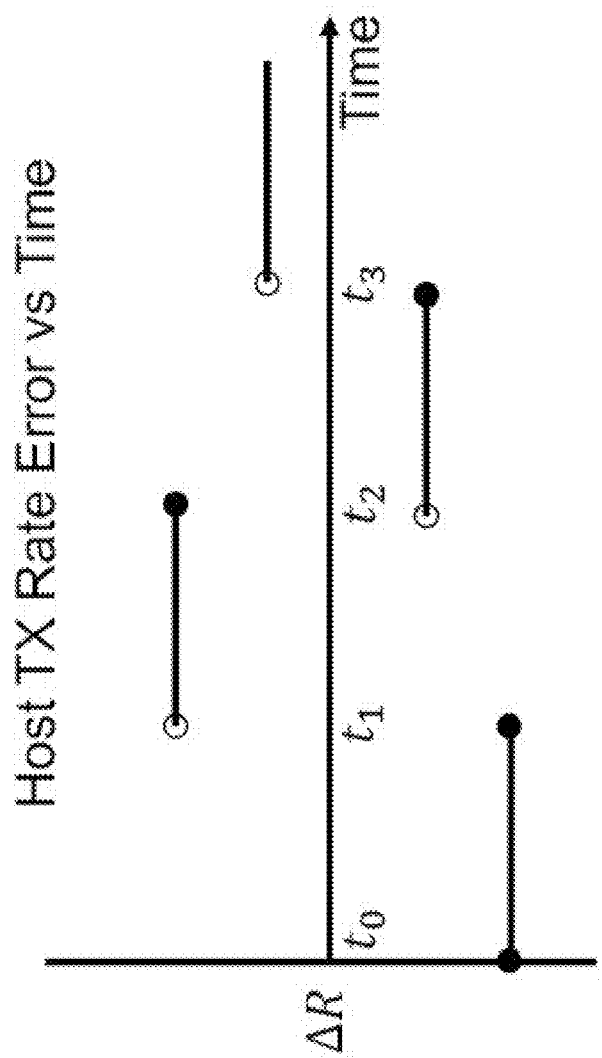
FIG. 1A illustrates a graphical representation of a data host's transmission rate error over time in conventional RF transmission systems.

According to various embodiments, systems, devices, and methods include synchronizing the transmission rates of at least one data host and a radio frequency (RF) transmitter that converts data from the at least one data host to RF signals. In particular, the at least one data host may adjust its data transmission rate to match that of the transmission rate of the RF transmitter. As referenced herein, the transmission rate of a RF transmitter may include the processing time for the RF transmitter to retrieve digital data from memory and convert the digital data to analog RF signals. To synchronize the transmission rates, the data host may obtain a clock time of the RF transmitter and transmit data to the RF transmitter based on the clock time of the RF transmitter. The data host may transmit a time request to the RF transmitter to request for a clock time of the RF transmitter's clock. The data host may track the clock time of its own clock (which may also be considered the data host's clock) associated with when the time request is transmitted. Once the RF transmitter receives the time request, the RF transmitter may generate a corresponding time response with the requested clock time and transmit the time response back to the data host. In generating the time response, the RF transmitter may track the clock time of its clock (which may be the RF transmitter's clock) associated with when the RF transmitter received the time request. That clock time may be included in the time response that is subsequently transmitted to the data host.

The data host may receive the time response from the RF transmitter and may track the clock time of the data host's clock associated with when the time response is received. Thus, after receiving the time response, the data host may have the clock time of the data host's clock associated with when the time request was transmitted to the RF transmitter, the clock time of the RF transmitter's clock associated with when the RF transmitter received the time request, and another clock time of the data host's clock associated with when the data host received the time response.

The data host may generate a clock ratio between the data host's clock and the RF transmitter's clock using the data host clock's clock time associated with when the time request was transmitted and the RF transmitter clock's clock time associated with when the time request was received. The data host may then generate an estimate for a clock time of the RF transmitter's clock based on that clock ratio. The data host may adjust the rate it transmits data to the RF transmitter based on the estimate of the RF transmitter clock's clock time, which may allow the data host to synchronize its transmission rate with the RF transmitter's transmission rate.

The RF transmitter may be a digital RF SDR transmitter that includes one or more digital to analog converters (DACs) that convert the digital data received from a data host to analog RF signals. The rate at which a DAC converts data to RF signals controls the data transmission rate of the RF transmitter. The data host may have its own transmission rate. In conventional RF systems, the data host may transmit data to the RF transmitter at a higher rate than the RF transmitter can process and/or at a lower rate than the RF transmitter can process. Such differences in transmission rates may lead to various problems. If the transmission rate of the data hosts is greater than that of the RF transmitter, the RF transmitter receives additional data before previously received data has been converted to analog signals. The additional data will need to be stored, such as in one or more buffers. If the additional data exceeds the capacity of the one or more buffers, data may be lost. If the transmission rate of the data hosts is less than that of the RF transmitter, the RF transmitter may be underutilized.

Figure 1B:
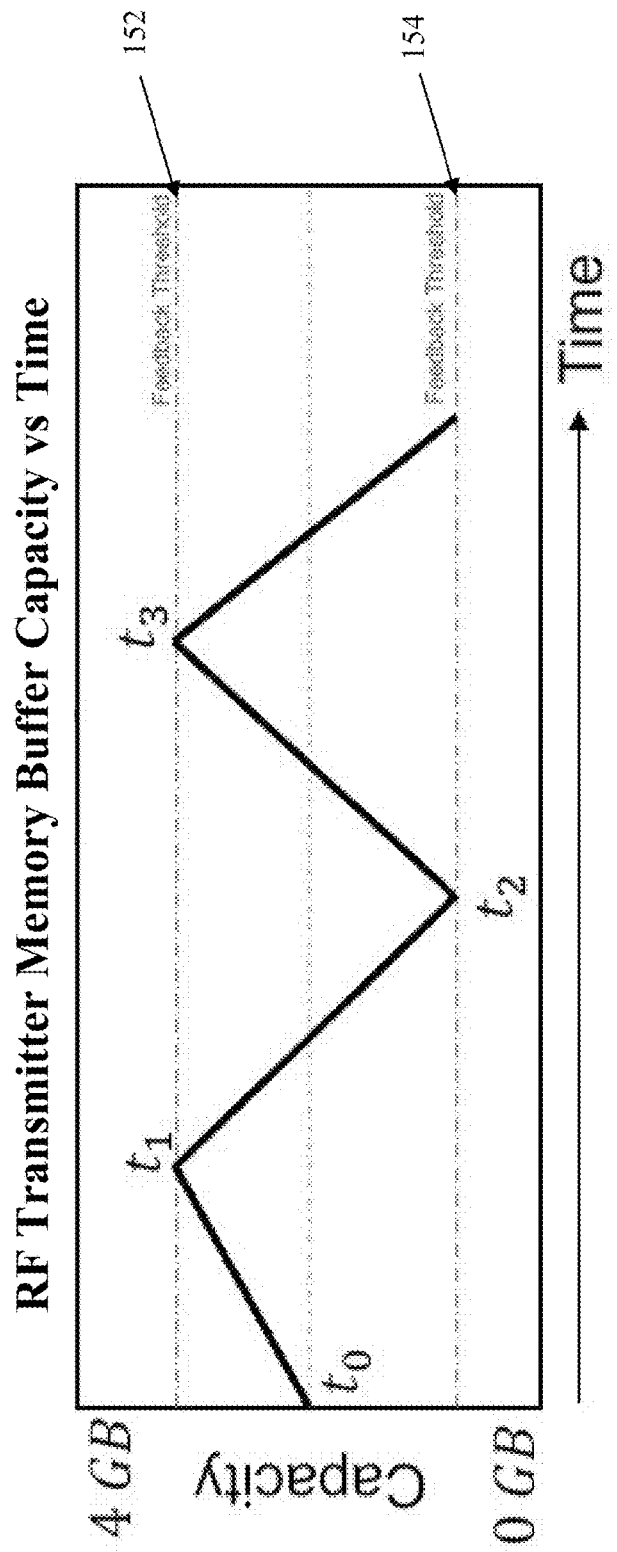
FIG. 1B illustrates a graphical representation of a RF transmitter's memory buffer capacity utilization over time in conventional RF transmission systems.

In conventional digital RF SDR systems, a data host may attempt to control its data transmission rate to better match the capability of the RF transmitter. FIGS. 1A and 1B illustrate ways that such conventional systems attempt to do this. FIG. 1A illustrates a graphical representation 100 of a data host's transmission rate error over time in conventional digital RF SDR transmission systems. The transmission rate error may be the difference in a data host's transmission rate and a RF transmitter's transmission rate. In the graphical representation 100, the horizontal axis indicates time, and the vertical axis indicates the transmission rate difference $\Delta R$ between the data host and a RF transmitter. The transmission rate difference $\Delta R$ is the transmission rate of the RF transmitter $R_{SiP}$ subtracted by the transmission rate of the data host $R_{HOST}$, or $\Delta R = R_{SiP} - R_{HOST}$. It may be noted that the present disclosure may use $R_{SiP}$ as the label for the RF transmitter's transmission rate based on an example implementation of the RF transmitter as a system in package (SiP).

Generally, in conventional systems, the data host has information on the theoretical transmission rate of the RF transmitter when it begins transmitting data to the RF transmitter. However, the data host may lack information on the actual transmission rate of the RF transmitter due to the data host and RF transmitter operating with different clocks. Thus, the data host may make an initial estimate of the RF transmitter's transmission rate that is not based on any information about the RF transmitter's actual transmission rate, and proceed to transmit data at the estimated transmission rate. However, the data host's estimation of the RF transmitter's transmission rate may not be accurate, so when the data host begins transmitting data at time $t_0$, the reality may be that the data host overestimated the RF transmitter's transmission rate. As a result, at time $t_0$, $R_{HOST} > R_{SiP}$, and thus $\Delta R$ may be negative.

In such conventional systems, after the data host transmits data for a period of time at the estimated RF transmission rate, the data host may receive feedback from the RF transmitter at time $t_1$ that the data host was transmitting data at too fast of a transmission rate. This may provide information to the data host that it overestimated the RF transmitter's transmission rate and should lower the transmission rate to the RF transmitter. However, the feedback from the RF transmitter may not include direct information on the RF transmitter's transmission rate, and may instead only include indirect information on the RF transmitter's transmission rate. More specifically, the RF transmitter may include a memory buffer that helps absorb the transmission rate difference between the RF transmitter and the data host (or helps account for the transmission rate variability once the transmission rates have been synchronized) by buffering the data that has been received from the data host but has not yet been transmitted by the RF transmitter. Feedback that the buffer utilization has gotten too high may indicate that the RF transmitter's transmission rate is lower than the data host's transmission rate, while feedback that the buffer utilization has gotten too low may indicate that the RF transmitter's transmission rate is higher than the data host's transmission rate. However, both types of feedback may only offer indirect information on the RF transmitter's transmission rate.

FIG. 1B illustrates a graphical representation 150 of a conventional RF transmitter's memory buffer capacity utilization over time. In the graphical representation, the horizontal axis indicates time, and the vertical axis indicates the RF transmitter's memory buffer capacity utilization. As described above, at time $t_0$, a conventional data host may transmit data to the RF transmitter based on an estimated transmission rate for the RF transmitter. The estimate may be an overestimation, which may mean the data host transmits data at a faster transmission rate than the RF transmitter and causes the memory buffer capacity utilization to steadily increase. When the memory buffer capacity utilization reaches a feedback threshold 152 at time $t_1$, corresponding feedback may be provided to the data host to indirectly indicate that the data host's transmission rate is too high. Similarly, if the data host's transmission rate is lower than that of the RF transmitter, such as from time $t_1$ to time $t_2$, the memory buffer capacity utilization may gradually reduce until it reaches a second threshold 154 at time $t_2$, when a corresponding feedback may be provided to the data host to indicate that its transmission rate is too low. Thus, even though the data host may understand from the feedback that its transmission rate should be adjusted, the data host may have insufficient information for determining the specific extent to adjust its transmission rate. As a result, the data host may continue to make estimates of the RF transmitter's transmission rate from times $t_1$ to $t_3$ and beyond, leading to the oscillating $\Delta R$.

A similar process may repeat each time the data host receives feedback from the RF transmitter, and the data host may adjust its transmission rate each time based on that feedback. The repetition of this process may correspond to times $t_1$ to $t_3$ and beyond in FIGS. 1A and 1B. As the process repeats, the data host may eventually be able to accurately determine the transmission rate of the RF transmitter, such that $\Delta R$ approaches 0. However, this process may take a substantial amount of time before the transmission rates synchronize as a result of $\Delta R$ converging to 0, if at all. During that time, the potential problems described above (lost data or underutilization of the RF transmitter) may still persist.

In contrast to such conventional systems, the systems described herein synchronize transmission rates between the data host and the RF transmitter so that the amount of data transmitted to the RF transmitter in a given amount of time does not exceed the capacity of the RF transmitter to transmit the data. In the systems described herein, the data host may more accurately determine the RF transmitter's transmission rate over a shorter period of time. This may allow the transmission rates of the data host and RF transmitter to synchronize more quickly and reduce the effects of the problems from unsynchronized transmission rates. The transmission rates synchronizing more quickly may also reduce the buffering capacity required of the RF transmitter's memory buffer to an amount that is suitable to be implemented with on-chip memory, which may result in the synchronization process being efficient and scalable.

In the following description of the various examples, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing distinct functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Figure 2:
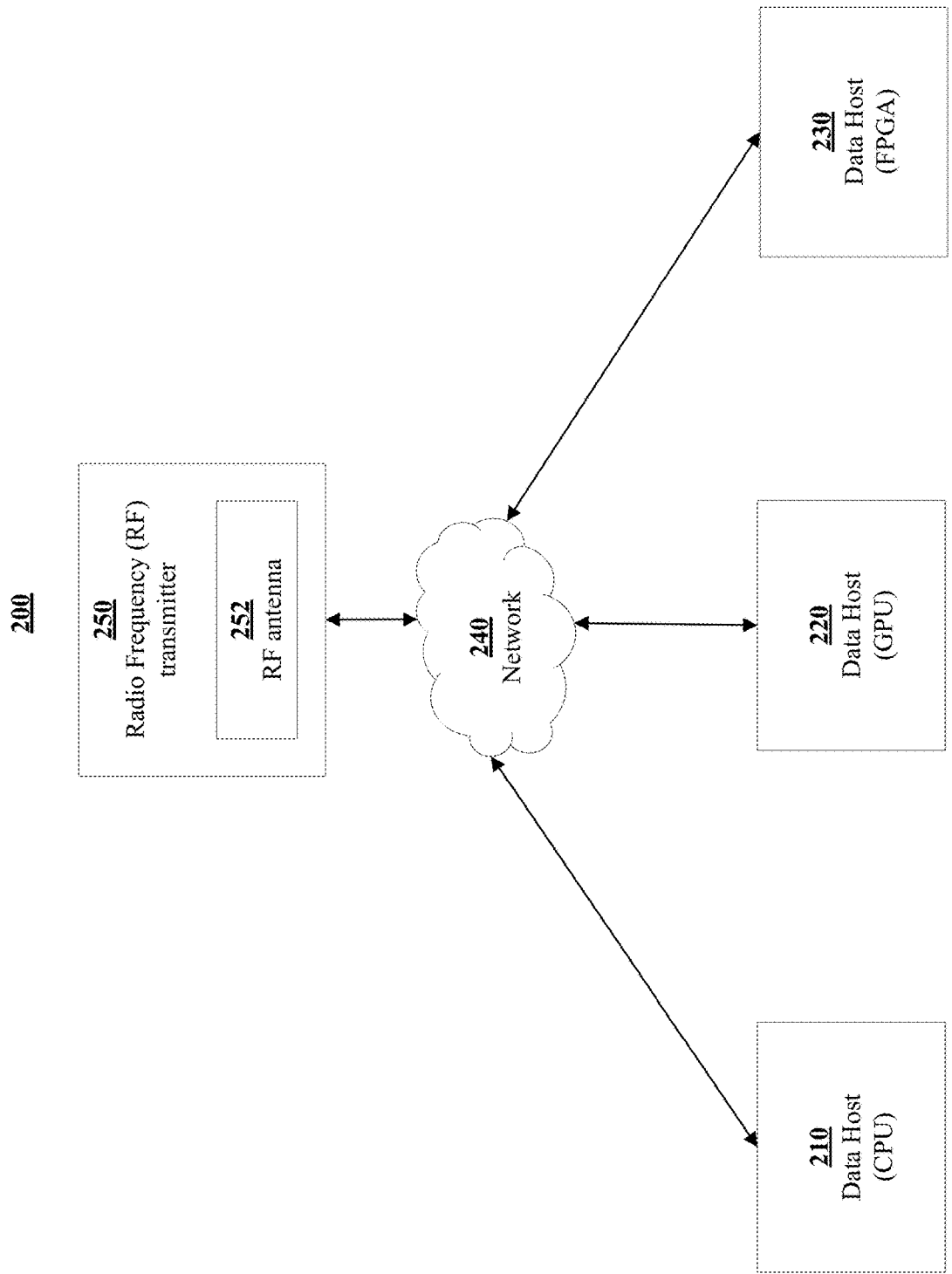
FIG. 2 illustrates a schematic of an exemplary system.

FIG. 2 illustrates a schematic of an exemplary system 200 configured to synchronize transmission rates between a data host and an RF transmitter. Although the present disclosure may be applicable to various system architectures, the components in the exemplary system 200 may provide examples of the components that may execute the various steps described herein, and the present disclosure may similarly be described with respect to at least some of the components of the exemplary system 200. In various embodiments, the exemplary system 200 may be a digital RF SDR system.

The exemplary system 200 may include one or more data hosts (such as data hosts 210, 220, and 230) that transmit various digital data over a network 240 to a radio frequency (RF) transmitter 250. The RF transmitter 250 may then convert the digital data to analog signals that are modulated onto and transmitted as RF signals via one or more RF antennas 252 of the transmitter. In various embodiments, the data hosts 210-230, the network 240, and the RF transmitter 250 may be physically separate components that are able to communicate with one another via one or more communication pathways. In various other embodiments, the data hosts 210-230, network 240, and RF transmitter 250 may be incorporated together into an integrated system, where the data hosts 210-230 may generate various data that is forwarded to the RF transmitter 250 via the network 240, and the RF transmitter 250 may then transmit the data to an external destination separate from the integrated system.

The data hosts 210-230 may be various components that may natively generate data, may have various data stored in memory, and/or may produce data after processing inputs from other sources, such as signals from various sensors. For example, the data host 210 may include one or more central processing units (CPUs) which may generate data from performing various lightweight or sequential tasks and processes. The data host 220 may include one or more graphics processing units (GPUs) which may generate data from performing various parallel tasks and processes. The data host 230 may include one or more field-programmable gate arrays (FPGAs) which may generate data from performing highly optimized tasks and processes. In various embodiments, the exemplary system 200 may include fewer or more data hosts than that illustrated in FIG. 2. The exemplary system 200 may also include heterogeneous sets of data hosts 210-230, so the various data hosts may not be the same component (i.e., all CPU or all GPU), and may be any combination of various components (e.g., some CPU and some GPU).

The network 240 may be any system for connecting the data hosts 210-230 and the RF transmitter 250. For example, the network 240 may include one or more physical connections such as ethernet connections or fiber optic connections and any arrangement of processing nodes (e.g., routers, switches, etc.) for transmitting data through the physical connections. The network 240 may include one or more wireless technologies, including Bluetooth, Wireless Fidelity (WiFi), and/or near-field communication (NFC), among many others. The bandwidth of the network 240 may also vary, and may vary in magnitude (i.e., the bandwidth may be megabits per second (Mbps) or gigabits per second (Gbps)). For example, the network 240 in various embodiments may be a 100 gigabit Ethernet (100 GbE) network.

The RF transmitter 250 may include various components for converting digital data to RF signals. For example, the RF transmitter 250 may be a system in package (SiP), a system on chip (SoC), or any other suitable computing architecture for direct conversion of digital data to analog, including any suitable arrangement of one or more processors (e.g., one or more FPGAs) connected to one or more digital to analog converters (DAC) and/or analog to digital converters (ADC). The RF transmitter 250 may receive data in digital form from the data hosts 210-230 via network 240, convert the data to one or more analog signals, and transmit the one or more analog signals via one or more RF antennas 252. Although the RF transmitter 250 is referred to herein as a transmitter, this is merely for convenience, and it should be understood that the RF transmitter 250 can include one or more components (e.g., one or more analog-to-digital converters) for and/or otherwise be configured for receiving RF signals and converting the RF signals to digital data that is transmitted over the network 240 to one or more destinations, such as any of the data hosts 210-230. Further, reference to RF transmitter herein is intended to encompass RF transmitters/receivers (i.e., transceivers).

The data hosts 210-230 and the RF transmitter 250 may each have an individual data transmission rate. The transmission rate of the data hosts 210-230 may be the rate that they transmit data to the RF transmitter 250, and the transmission rate of the RF transmitter 250 may be the rate that it converts the digital data received from the data hosts 210-230 to analog and transmits the analog signals to another destination. According to the principles described herein, the data hosts 210-230 obtain clock time information from the RF transmitter 250 and use that clock time to synchronize their transmission rate to that of the RF transmitter 250.

The principles described herein may be based at least partially on the observation that transmission rates may be considered as transmitting a given amount of data over a given amount of time. Because the amount of data that the data host and RF transmitter transmits may be the same, synchronizing the transmission rates may be achieved if the amount of time that the data host and RF transmitter takes to transmit the data is synchronized.

Using the same notation as above where the transmission rate of the RF transmitter is represented as $R_{SiP}$ and the transmission rate of the data host is represented as $R_{HOST}$, the transmission rates of the data host and RF transmitter may be considered synchronized when $R_{SiP}=R_{HOST}$. Then, if the transmission rates are considered as an amount of data over an amount of time, the transmission rate synchronization objective of $R_{SiP}=R_{HOST}$ may also be written $$\frac{N_S}{M_S} = \frac{N_H}{M_H} \qquad (1)$$

where $N_S$ may denote the amount of data (such as a number of bytes) transmitted by the RF transmitter, $N_h$ may denote the amount of data transmitted by the data host, $M_S$ may denote the time (such as in seconds) that the RF transmitter took to transmit the $N_S$ amount of data, and $M_H$ may denote the time that the data host took to transmit the $N_H$ amount of data. While it may be the case that $N_S=N_H$ because the RF transmitter transmits all the data it receives from the data host, $M_S=M_H$ may not be the case in conventional RF systems as the data host and RF transmitter may take different amounts of time to transmit the same amount of data. In contrast, the systems and methods described herein may control the transmission rate of the data host so that $M_S=M_H$.

The data host and RF transmitter may each include a clock that regulates the timing and speed for the data host and RF transmitter's respective operations, and thus the clock times of those clocks may be used to help determine their respective transmission rates. That is, the amount of time that the data host and RF transmitter take to transmit a given amount of data may be determined by the clock times of the data host and RF transmitter's respective clocks. However, the clocks for the data host and RF transmitter may not be synchronized with one another due to the clocks operating at different speeds. This may mean that at any given point in time, there may be differences between the specific clock times of the data host and RF transmitter's respective clocks. This may in turn cause the data host and RF transmitter to use different amounts of time even when transmitting data over the same range of specific clock times. However, conventional RF systems may not adequately account for this factor when attempting to synchronize transmission rates. In contrast, the data host in the systems and methods presented herein may synchronize the clock times for its clock and that of the RF transmitter by accounting for any differences in clock times between the clocks. Doing so may allow $M_S=M_H$, which may in turn allow equation (1) to be satisfied and the difference between transmission rates $\Delta R$ to approach 0.

Figure 3A:
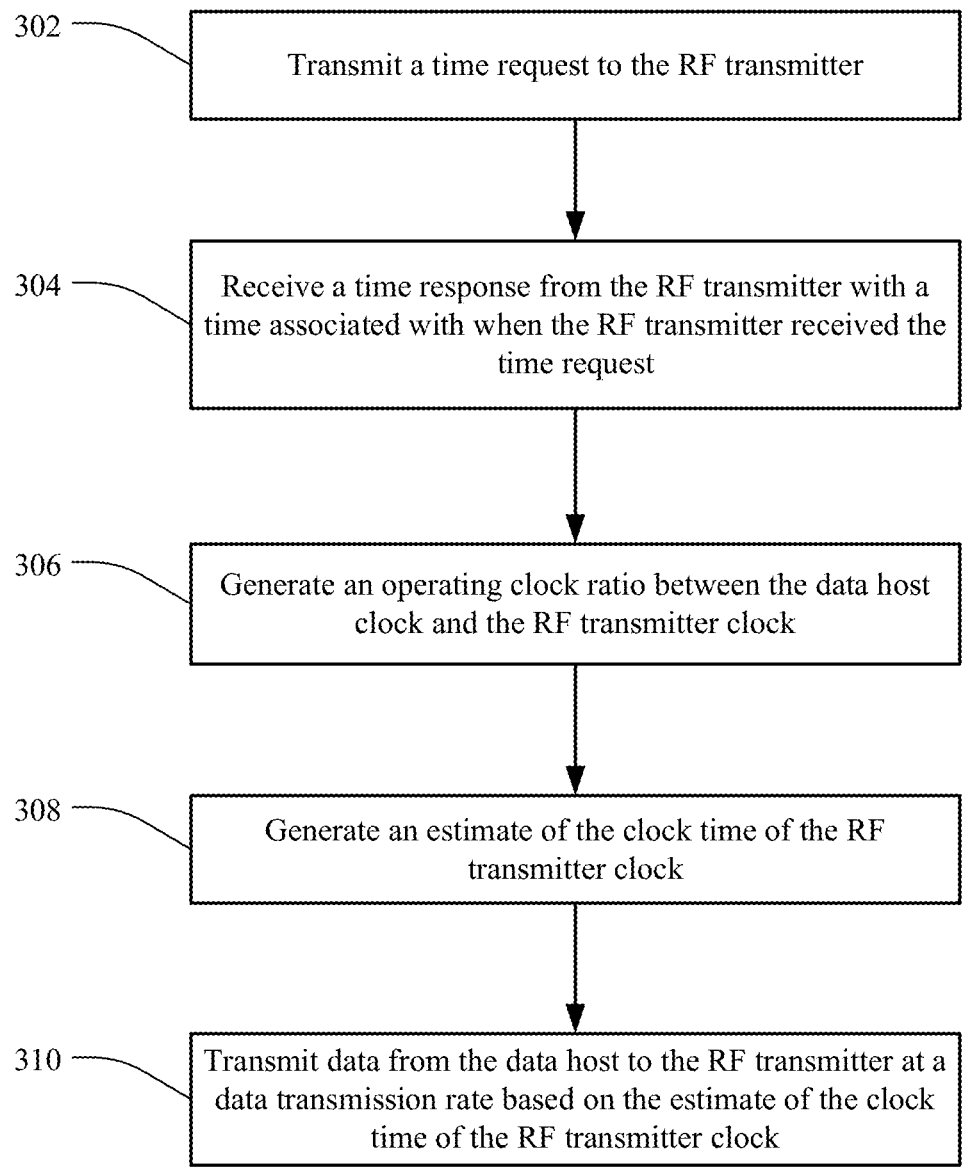
FIG. 3A illustrates a method for synchronizing the data transmission rates of a data host and a RF transmitter.

FIG. 3A illustrates a method 300 for synchronizing the data transmission rates of a data host and a RF transmitter by synchronizing the clock times of their respective clocks. In various embodiments, the method 300 may be executed as an application by a data host, such as any of data hosts 210-230 of FIG. 2, when transmitting data to a RF transmitter, such as RF transmitter 250 of FIG. 2. The method 300 may begin at step 302 where a data host may transmit a time request to the RF transmitter. The time request may be a request by the data host for the RF transmitter to provide the RF transmitter's clock time associated with when the RF transmitter receives the request. The time request may be sent at a specific clock time of the data host's clock, and the data host may track that time to subsequently help estimate the RF transmitter clock time and synchronize the clocks. The time request in various embodiments may be based on the Precise Timing Protocol (PTP), which is a protocol used to synchronize the device clocks in a computer network through the exchange and processing of various messages across the network.

At step 304, the data host may receive a time response from the RF transmitter. The time response may include a clock time associated with when the RF transmitter received the time request transmitted by the data host at step 302. The time response in various embodiments may also be based on the PTP, and together with the time request, may help synchronize the clocks of the data host and RF transmitter. It may be noted that the clock time in the time response may be the clock time from the RF transmitter's clock, and not the clock time from the data host's clock. The clock time of the RF transmitter's clock in the time response may be in various formats depending on the clock time format used by the RF transmitter's clock. For example, various embodiments may implement the clock time as a running counter that tracks the number of completed clock cycles, which may mean the clock time in the time response is a count corresponding to the number of completed clock cycles associated with when the time request was received. Various other embodiments may also implement the clock time in a particular format, such as a datetime format, which may mean the clock time in the time response is a datetime associated with when the time request was received. The data host may also track the clock time of its own clock corresponding to when the data host received the time response from the RF transmitter. After step 304, the data host may have three clock time data points: (1) the clock time of the data host's clock associated with when the time request was transmitted to the RF transmitter, (2) the clock time of the RF transmitter's clock associated with when the RF transmitter received the time request, and (3) a second clock time of the data host's clock associated with when the data host received the time response.

Figure 3B:
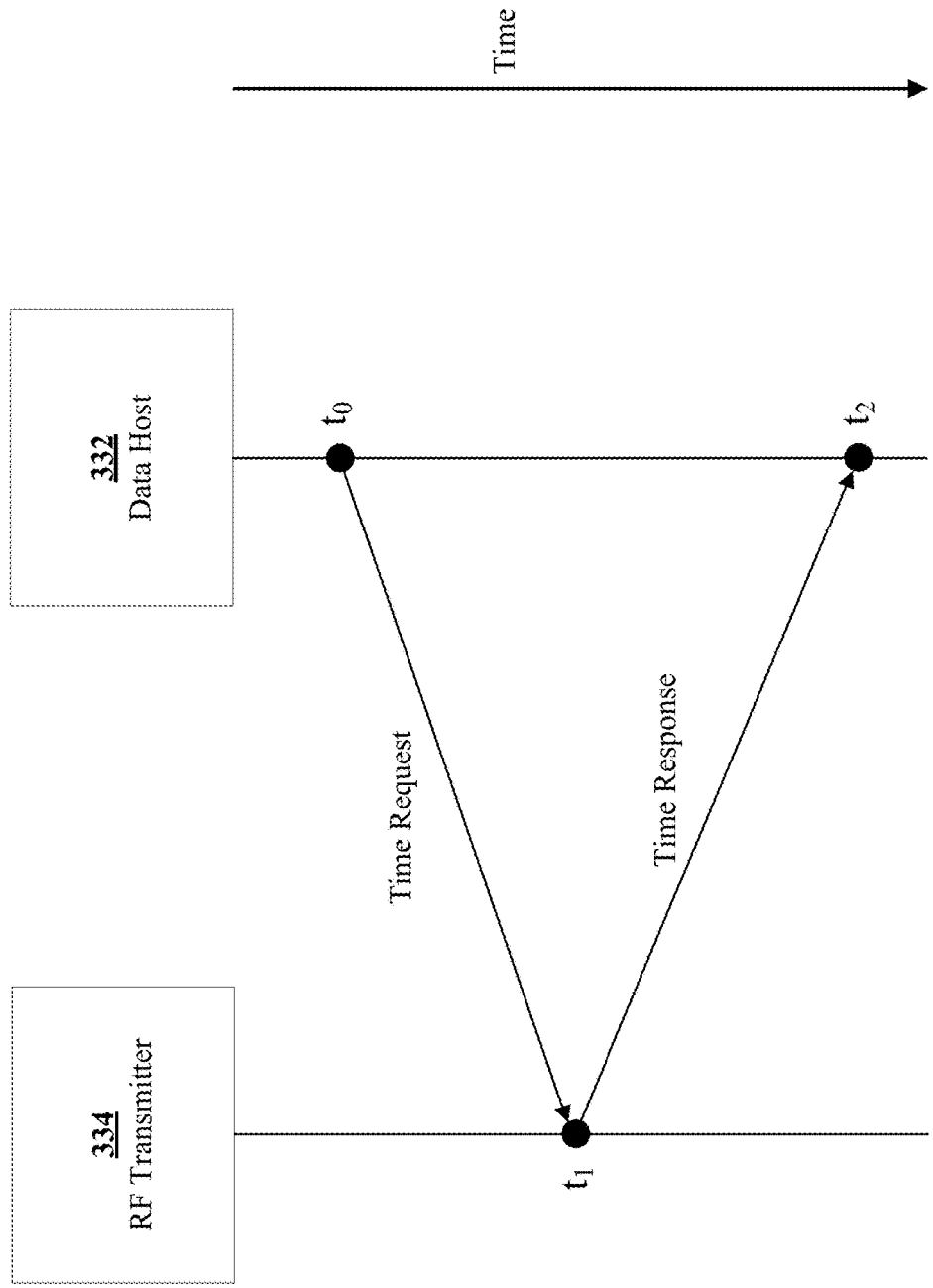
FIG. 3B illustrates a schematic of transmitting a time request and receiving the corresponding time response.

FIG. 3B illustrates a schematic 330 of transmitting a time request and receiving the corresponding time response. As illustrated, the downward direction of the vertical axis indicates the forward flow of time. At time $t_0$, the data host 332 may transmit a time request to the RF transmitter 334. The time request may be transmitted via a network that connects the data host 332 and the RF transmitter 334, such as the network 240 of FIG. 2. The data host 332 may track time $t_0$ as the clock time of the data host's clock associated with when the data host 332 transmitted the time request. In various embodiments, the time request being transmitted at time $t_0$ from the data host 332 may correspond to step 302 of method 300.

At time $t_1$, the RF transmitter 334 may receive the time request. The RF transmitter 334 may then process the time request and generate the corresponding time response that includes the clock time of the RF transmitter's clock associated with when the RF transmitter received the time request. After generating the time response, and also at time $t_1$, the RF transmitter 334 may transmit the time response back to the data host 332.

At time $t_2$, the data host 332 may receive the time response from the RF transmitter 334. As a result, the data host 332 at time $t_2$ may have information on the clock time of the RF transmitter's clock associated with when the RF transmitter 334 received the time request the data host 332 transmitted at time $t_0$. The data host 332 may also track time $t_2$ as the clock time of the data host's clock associated with when it received the time response. In various embodiments, the RF transmitter 334 processing the time request then generating and transmitting the time response at time $t_1$, and the data host 332 receiving the time response at time $t_2$ may correspond to step 304 of method 300. As also described above with respect to step 304 of method 300, at time $t_2$ the data host 332 may have three clock time data points: (1) time $t_0$ for the clock time of the data host's clock associated with when the time request was transmitted, (2) time ty for the clock time of the RF transmitter's clock associated with when the time request was received, and (3) time $t_2$ for the clock time of the data host's clock associated with when the time response was received.

It may be noted that because the time request is transmitted to the RF transmitter 334 over a network, the time $t_1$ that the data host 332 may subsequently use to help synchronize the transmission rate may depend on a consistent network latency between the data host 332 and RF transmitter 334. Otherwise, if the network latency is unpredictable and varies significantly, then the data host 332 may not be able to reliably use the time $t_1$. Thus, various embodiments may consider first characterizing the variability in network latency between the data host 332 and RF transmitter 334 to determine if a consistent network latency is possible, which may be accomplished in any appropriate manner.

Referring back to method 300, at step 306, the data host may generate an operating clock ratio between the data host's clock and the RF transmitter's clock based on the three clock time data points obtained after step 304. It may be noted that the operating clock ratio may be relevant because the difference between the clock times of the data host and RF transmitter's respective clocks may remain proportional even if the actual clock times continue drifting apart over time. In other words, the operating clock ratio may be generated based on the clock drift of the data host and RF transmitter's respective clocks remaining relatively consistent over time.

Figure 3C:
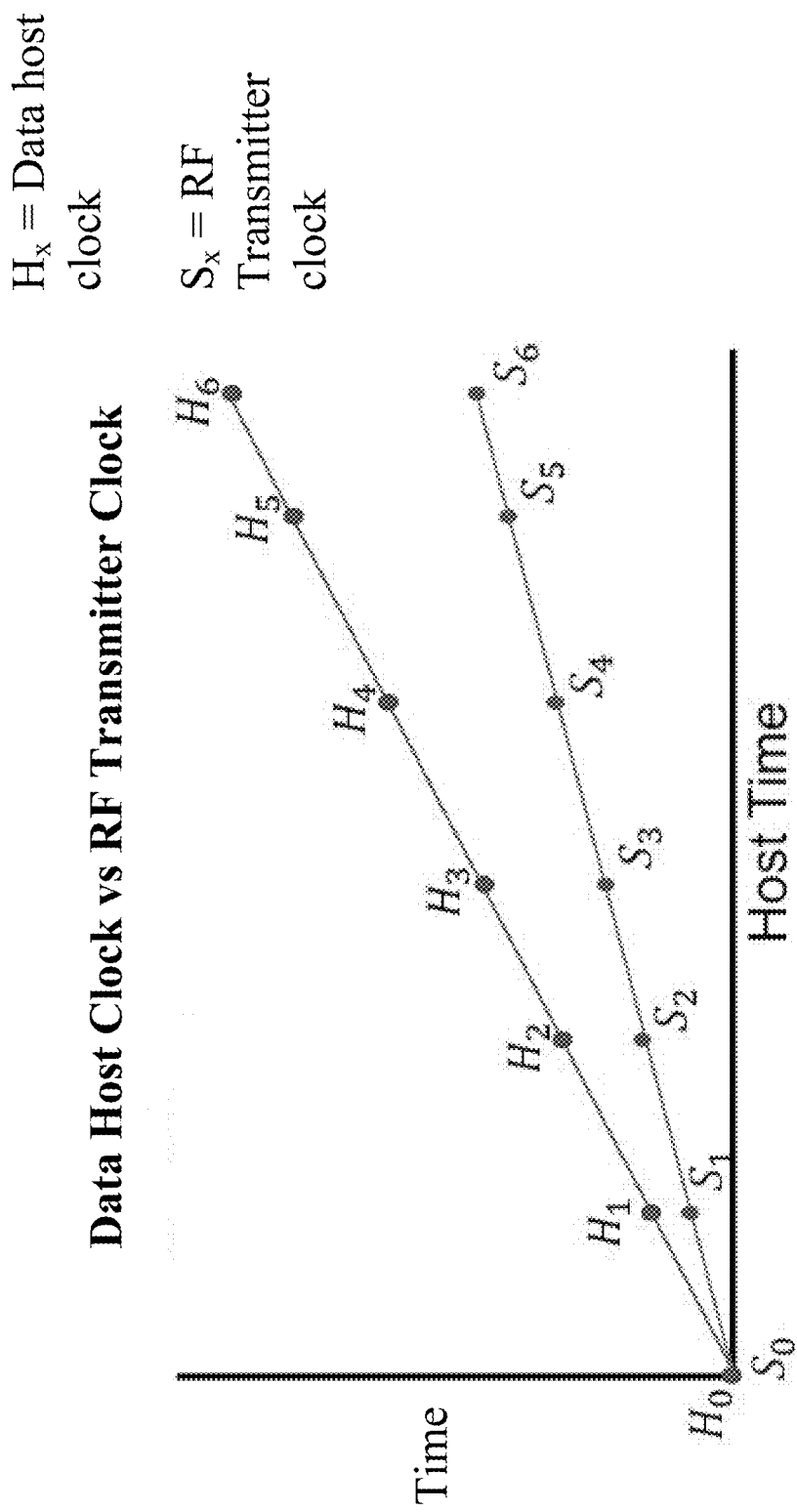
FIG. 3C illustrates a graphical representation of the relation of the clock times between a data host and RF transmitter's respective clocks.

FIG. 3C illustrates a graphical representation 360 of the relation of the clock times between a data host and RF transmitter's respective clocks. The horizontal axis indicates the clock times of the data host's clock, and the vertical axis indicates the corresponding clock times of the data host and RF transmitter's respective clocks. The $H_X$ data points may represent the clock times associated with various instances when a time request was transmitted from the data host to the RF transmitter. In other words, the $H_X$ data points may represent the clock times of the data host's clock from various instances of executing step 302 of method 300, or various instances of time $t_0$ of FIG. 3B. The $S_X$ data points may represent the clock times associated with various instances when the time request was received by the RF transmitter and when the time response was transmitted back to the data host. In other words, the $S_X$ data points may represent the clock times of the RF transmitter's clock from various instances of transmitting the time response in step 304 of method 300, or various instances of time $t_1$ of FIG. 3B. As shown in FIG. 3C, the data host's clock times $H_X$ may lie on the diagonal, but the RF transmitter's clock times $S_X$ may lie off the diagonal as the RF transmitter's clock may operate at a different speed and thus result in its clock times for any specific moment not corresponding completely to the data host's clock times at that moment. However, the difference between the data host and RF transmitter's clock times may remain proportional even as time goes on, which may allow a clock ratio to be generated between the data host and RF transmitter's respective clocks.

Referring back to step 306 of method 300, the operating clock ratio $\theta_n$ between the data host and RF transmitter's respective clocks at a given time n may be generated as:

$$\theta_n = \frac{H_n - H_{n-1}}{S_n - S_{n-1}} = \frac{\Delta H_n}{\Delta S_n} \quad (2)$$

where $H_n$ and $H_{n-1}$ may be two instances of the clock times of the data host's clock associated with when two different time requests were transmitted to the RF transmitter, and $S_n$ and $S_{n-1}$ may be two instances of the clock times of the RF transmitter's clock included in two different time responses and associated with when the RF transmitter received two different time requests from the data host. That is, the data host may transmit a first time request to the RF transmitter, and the data host may track the clock time of the data host's clock associated with when the first time request was transmitted, which corresponds to $H_{n-1}$ of equation (2). The data host may then receive a first time response from the RF transmitter corresponding to the first time request, where the first time response includes the RF transmitter clock's clock time associated with when the RF transmitter received the first time request, which corresponds to $S_{n-1}$ of equation (2). The data host may then transmit a second time request to the RF and track the data host clock's clock time associated with when the second time request was transmitted, which corresponds to $H_n$ of equation (2). The data host may then receive a second time response, corresponding to the second time request, with the RF transmitter clock's clock time associated with when the second time request was received, which corresponds to $S_n$ of equation (2). The operating clock ratio may then be generated using the clock times from the two time-request time-response transactions.

More generally, the operating clock ratio may be a ratio of the difference between two or more instances of when time requests are sent from the data host relative to the difference between multiple instances of when time requests are received by the RF transmitter. The operating clock ratio may also be considered the ratio of the speed of the data host's clock to the speed of the RF transmitter's clock. The operating clock ratio may then subsequently be used to synchronize the data host and RF transmitter's transmission rates. Each of the $H_X$ terms in equation (2) may also correspond to the $H_X$ data points in the graphical representation of FIG. 3C, and each of the $S_X$ terms in equation (2) may also correspond to the $S_X$ data points in the graphical representation of FIG. 3C. While equation (2) is described with $H_n$, $H_{n-1}$, $S_n$, and $S_{n-1}$ representing two instances of the clock times of the data host and RF transmitter's clocks, various embodiments may generate the operating clock ratio $\theta_n$ with one instance of the clock times. This means the operating clock ratio may be a ratio of a specific clock time of the data host's clock to a specific corresponding clock time of the RF transmitter's clock.

While the times $t_0$ and $t_1$ from FIG. 3B may be used to generate the operating clock ratio $\theta_n$, with the times $t_0$ and $t_1$ corresponding to the $H_X$ and $S_X$ terms of equation (2), the time $t_2$ from FIG. 3B may be used to account for any abnormal variance in network latency that may affect the clock ratio. For example, the data host may use the difference between time $t_2$ and $t_0$ to determine the round trip network latency from transmitting the time request to receiving the time response from the RF transmitter. The data host may then compare the round trip network latency for any given instance of the time request and time response to the round trip network latencies determined for previous instances of the time request and time response to assess the network latency stability before generating the operating clock ratio. If a particular round trip network latency is determined to be a statistical outlier, that may indicate the times $t_0$ and $t_1$ for a particular time request and time response pair would yield an inaccurate operating clock ratio $\theta_n$ due to the effects of the abnormal network latencies on the measured clock times. Thus the data host may elect to not generate an operating clock ratio using those particular instances of times $t_0$ and $t_1$.

To further account for various factors that may cause the operating clock ratio to vary (such as network latency variability, processing speed variability by the RF transmitter, or inherent noise that is present in the operating clock ratio), the operating clock ratio $\theta_n$ generated at step 306 may also be generated as an average of multiple individual clock ratios, where each individual clock ratio may be generated based on equation (2). Thus, generating the individual clock ratios may mean obtaining multiple instances of $H_n$ and $H_{n-1}$ as well as $S_n$ and $S_{n-1}$, which may in turn include repeating the steps of transmitting the time request to the RF transmitter and receiving the time response from the RF transmitter. Various different averages may also be used when generating the operating clock ratio in this case, such as an overall average of all the individual clock ratios, a moving average of a number of the most recent individual clock ratios, or a weighted or exponentially weighted average of some or all the individual clock ratios, among many others. Using the example of a moving average, the operating clock ratio $\theta_n$ between the data host and RF transmitter's respective clocks at a given time n may be generated as:

$$\hat{\theta}_n = \frac{1}{k}\sum_{i=n-k}^{n-1} \frac{\Delta H_i}{\Delta S_i} = \frac{1}{k}\sum_{i=n-k}^{n-1} \theta_i \quad (3)$$

where k may be the number of individual clock ratios to average over, n may be the total number of individual clock ratios, $\Delta H_i$ corresponds to $\Delta H_n$ of equation (2), $\Delta S_i$ corresponds to $\Delta S_n$ of equation (2), and $\theta_i$ corresponds to $\theta_n$ of equation (2). In other words, the operating clock ratio $\hat{\theta}_n$ may be generated as the moving average of the most recent k individual clock ratios that were generated using equation (2).

Figure 3D:
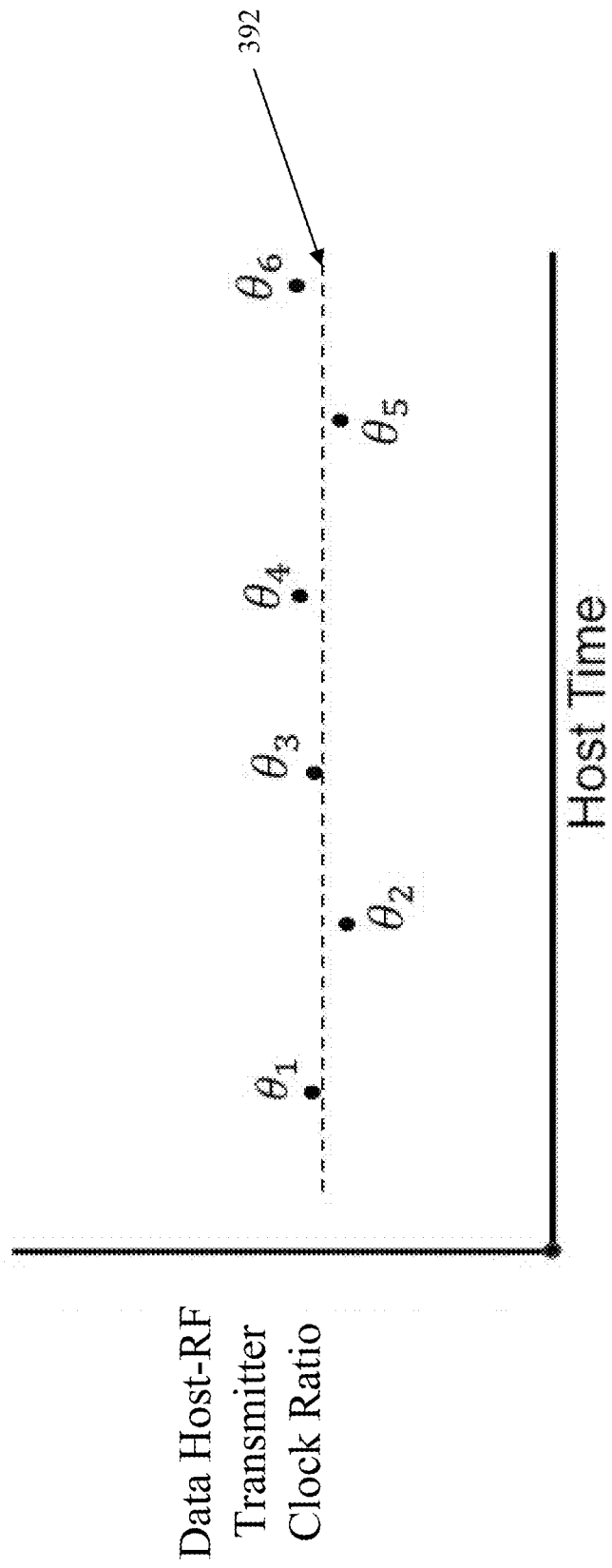
FIG. 3D illustrates a graphical representation of the data host clock to RF transmitter clock ratio over time.

FIG. 3D illustrates a graphical representation 390 of the data host clock to RF transmitter clock ratio over time. The horizontal axis indicates the clock times of the data host's clock, and the vertical axis indicates the ratios between the data host and RF transmitter's clocks. As illustrated in the figure, multiple individual clock ratios $\theta_n$ (i.e., $\theta_1$, $\theta_2$, ..., $\theta_6$) may be generated, and each of the individual clock ratios may vary slightly from one another, which may be due to various factors external to the data host or the RF transmitter. However, by generating the operating clock ratio $\theta_n$ as an average 392 of the individual clock ratios, the operating clock ratio overall may remain steady even if the clock ratio varies at specific times.

Referring back to method 300, after generating the operating clock ratio, at step 308, the data host may generate an estimate of the clock time of the RF transmitter's clock based on the operating clock ratio generated at step 306. In various embodiments, the estimate of the clock time of the RF transmitter's clock may be the data host's estimate of the clock time of the RF transmitter clock's that corresponds to a given clock time of the data host's clock. Using the operating clock ratio $\hat{\theta}_n$, the estimate of the RF transmitter's clock time $\hat{S}_n$ may be generated as:

$$\hat{S}_n = S_{n-1} + \frac{\Delta H_n}{\hat{\theta}_n} \quad (4)$$

where $S_{n-1}$ may be the RF transmitter clock's clock time from the most recently received time response (i.e., the most recent $t_1$ with respect to the schematic of FIG. 3B), and $\Delta H_n$ may be the difference between the data host clock's clock time when the most recent time request was transmitted to the RF transmitter (i.e., the most recent to with respect to the schematic of FIG. 3B) and the data host clock's clock time for which the estimate of the clock time of the RF transmitter clock is being generated for.

It may be noted that the estimate $\hat{S}_n$ may be generated as soon as an operating clock ratio $\hat{\theta}_n$ is available, regardless of whether the operating clock ratio $\hat{\theta}_n$ was generated from a single individual clock ratio or as an average of multiple individual clock ratios. This means that the estimate of the RF transmitter's clock time $\hat{S}_n$ may be generated after a single time request has been transmitted and a single corresponding time response is received, or after multiple time requests and multiple corresponding time responses. It may also be noted that because the estimate $\hat{S}_n$ depends on the operating clock ratio $\theta_n$ which may in turn have been generated based on the RF transmitter's clock times included in the time responses (as described above with respect to equations (2) and (3)), the estimate $\hat{S}_n$ may be a separate clock time of the RF transmitter's clock than the RF transmitter clock's clock times included in any time responses received by the data host (i.e., any instance of $t_1$ from FIG. 3B). The estimate of the RF transmitter's clock time $\hat{S}_n$ may also be generated in various formats. For example, various embodiments may generate the estimate $\hat{S}_n$ as a specific clock time in the same format as the clock times used to generate the estimate $\hat{S}_n$. That is, if the clock times of the data host and RF transmitter's clocks are implemented as a running counter of the number of completed clock cycles or a datetime format, then the estimate $\hat{S}_n$ may be a projected counter number or a future datetime, respectively.

Various embodiments may also generate the estimate $\hat{S}_n$ just as an offset that may be applied to the clock times of the data host and RF transmitter's clocks. That is, the estimate $\hat{S}_n$ may be an increment to be applied to a counter of completed clock cycles or a datetime offset to add to a given datetime. With the estimate $\hat{S}_n$, the data host may have a relatively accurate mapping of a clock time of its clock to a corresponding clock time of the RF transmitter's clock, which may allow the data host to satisfy $M_S=M_H$ and equation (1) and thus synchronize the transmission rates.

At step 310, the data host may transmit data to the RF transmitter at a data transmission rate based on the estimate $\hat{S}_n$ of the RF transmitter clock's clock time. The data host may transmit data to the RF transmitter using data packets of a given size, and the data packets may be transmitted at specific time intervals to achieve a particular transmission rate. Accordingly, the data host may use the estimate $\hat{S}_n$ of the RF transmitter clock's clock time to determine the specific time intervals to transmit the data packets at, instead of using the data host clock's clock time. This allows the $M_S=M_H$ condition of equation (1) to be satisfied, which allows the data host to transmit data at a transmission rate that is synchronized with that of the RF transmitter.

It may also be noted that the operating clock ratio $\theta_n$ itself without the estimate $\hat{S}_n$ of the RF transmitter clock's clock time may not be sufficient for the data host to determine the data transmission rate to transmit data to the RF transmitter. This is because the operating clock ratio $\theta_n$ may just be an estimate of the clock rate difference between the data host and RF transmitter's clocks. The operating clock ratio $\theta_n$ may naturally include some error, so if only the operating clock ratio is used to synchronize the data host and RF transmitter's clocks as well as determine the data host's transmission rate, the natural error may be integrated into the synchronization process, which may cause the data host and RF transmitter's clocks, and in turn the data host and RF transmitter's transmission rates, to diverge and become unsynchronized. With the estimate $\hat{S}_n$ of the RF transmitter clock's clock time generated from each instance of a time request and corresponding time response, the actual clock time of the RF transmitter's clock may be measured and utilized. This may help prevent the synchronization of the data host and RF transmitter's clocks and transmission rates from diverging.

It may also be noted that, more generally, any number of clock times may be included in the time response received by the data host at step 304. This means the data host may execute one or more of steps 306-310 of method 300 to synchronize its clock to various clocks using the clock times that are included in the time response. For example, the time response including the clock time of the RF transmitter may allow the data host to synchronize its clock to the RF transmitter's clock, but the time response also including the clock time for a Global Positioning System's (GPS) clock may allow the data host to also synchronize its clock to the GPS's clock. In this case, the data host's clock also synchronizing with the RF transmitter's clock and the GPS's clock may allow high-bandwidth transmission rate synchronization as well as precise transmission scheduling.

Because the synchronization of the transmission rates between the data host and RF transmitter may be based on the data host's estimates of the RF transmitter clock's clock time, there may be some uncertainty in the synchronization. Thus, and as described above, the RF transmitter may include a memory buffer that helps account for any transmission rate variability that may be present after the transmission rates have been synchronized. After the memory buffer has been built up with data, with the transmission rates synchronized, there may not be major fluctuations in the amount of data that is in the buffer, which may have been the case with unsynchronized transmission rates that may also lead to results of conventional systems such as those illustrated in FIG. 1B. This may allow the overall capacity of the memory buffer to be reduced (such as from 4 gigabytes in FIG. 1B to on the order of megabytes) since the range in the amount of data that the memory buffer should accommodate may just need to be enough to account for any uncertainty in the synchronized transmission rates. The reduction in capacity requirements may mean that the memory buffer may remain as on-chip memory that is integrated directly into the processors of the RF transmitter. The on-chip memory may allow the RF transmitter to retrieve data from the memory buffer and subsequently transmit data to another destination at faster rates than if the memory buffer were implemented as off-chip memory to account for the large fluctuations in the amount of data that may build up due to longer sustained periods of different transmission rates between the data host and the RF transmitter in conventional RF systems.

Figure 4:
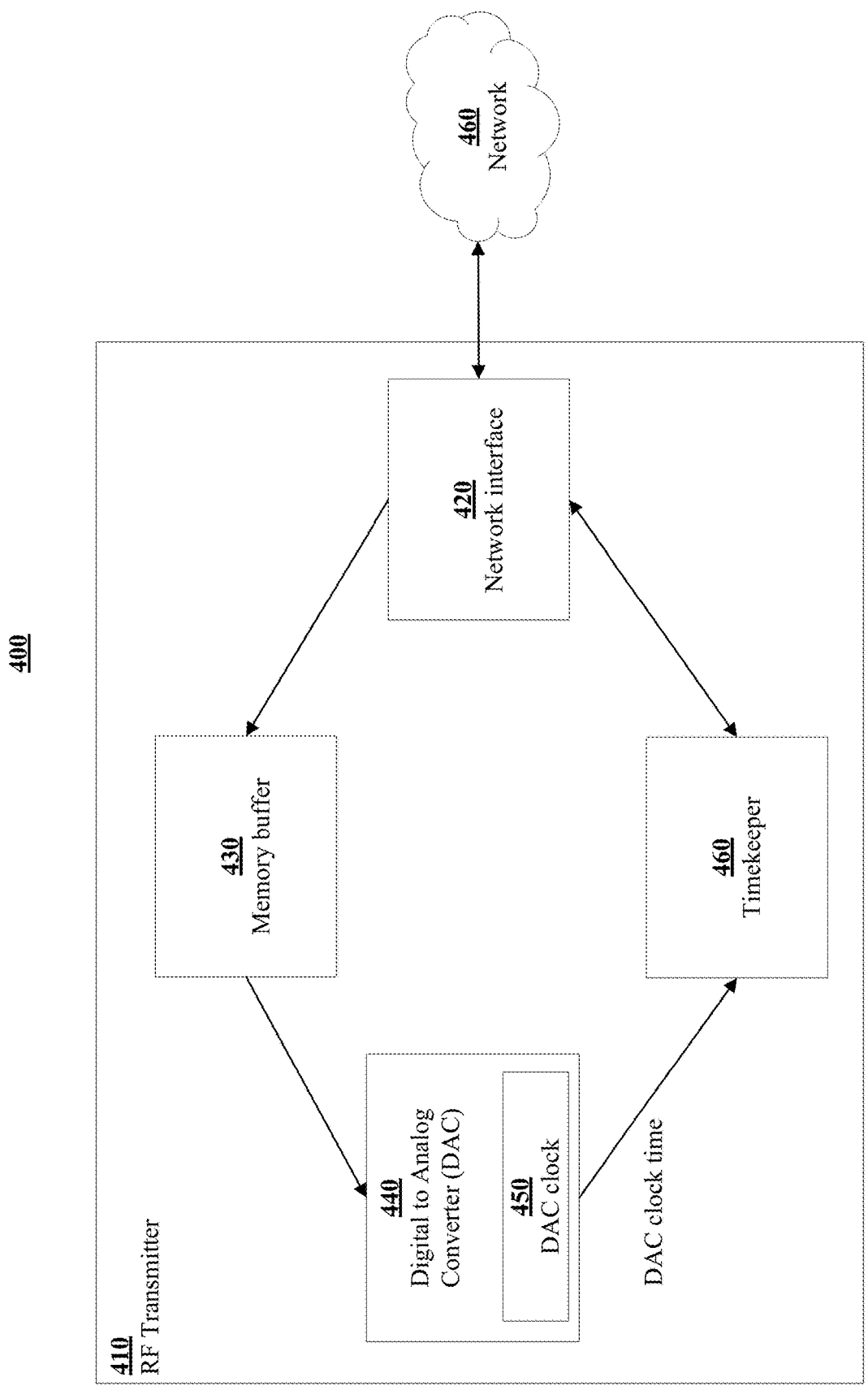
FIG. 4 illustrates a system schematic of an exemplary RF transmitter.

FIG. 4 illustrates a system schematic 400 of an exemplary RF transmitter 410. In various embodiments, the RF transmitter 410 may correspond to the RF transmitter 250 of FIG. 2. As described above, the RF transmitter 410 may communicate with a data host (such as any of 210-230 of FIG. 2) over a network 460. The network 460 may be various systems that connect the RF transmitter 410 to a data host and may have various bandwidths. For example, the network 460 may be a 100 gigabit ethernet connection (100 GbE). The RF transmitter 410 may include a network interface 420 that may allow the RF transmitter 410 to communicate with a data host via the network 460. If the network 460 is a 100 GbE, the network interface 420 may be various hardware that allows the RF transmitter 410 to communicate via the 100 GbE.

The RF transmitter 410 may also include a memory buffer 430. The memory buffer 430 may store the data that the RF transmitter 410 has received from a data host but which has not yet been transmitted (i.e., processed by the digital to analog converter(s)—described below). The memory buffer 430 may be used to help account for any transmission rate variability that may be present between a data host and the RF transmitter 410 after the transmission rates have been synchronized, such as due to a level of uncertainty in the synchronization or an inherent amount of variability in network latency. As described above, the transmission rates between a data host and the RF transmitter 410 being synchronized may reduce the capacity needed for the memory buffer 430 and may allow the memory buffer 430 to be implemented as on-chip memory. That is, the memory buffer 430 may be integrated into the RF transmitter's processor(s) that handle converting the data from the memory buffer 430 to RF signals. The capacity of the memory buffer 430 may also depend on the magnitude of the network latency variability. That is, the larger the network latency variability, the larger the capacity of the memory buffer 430 to account for that variability.

The RF transmitter 410 may also include one or more digital to analog converters (DAC) 440 that may take the data from the memory buffer 430 and transmit it to another destination. In various embodiments, the RF transmitter 410 may also include multiple DACs. The DAC 440 may convert data from a digital form to RF signals for transmission via one or more RF antennas, such as the antennas 252 of FIG. 2. Because the DAC 440 may be the component of the RF transmitter 410 that is transmitting the data, the transmission rate of the RF transmitter 410 may be determined by the processing rate of the DAC 440, which may be determined by a DAC clock 450 associated with the DAC 440. While a data host may generate an estimate of the clock time of the DAC clock 450 (as the RF transmitter's clock) as described above with respect to method 300, the DAC clock 450 may still store the actual clock time for the clock. This means that there may be two versions of the clock time for the DAC clock 450 when synchronizing the transmission rates between a data host and the RF transmitter 410: the data host's estimate of a clock time for the DAC clock 450 and the actual clock time of the DAC clock. Thus, the actual clock time of the DAC clock 450 may also be referenced herein as the true clock time of the DAC clock (and of the RF transmitter's clock) that is stored by the RF transmitter 410 to differentiate from the estimate generated by the data host. Although the DAC clock 450 may be illustrated as part of the DAC 440, various embodiments may include the DAC clock 450 separately from the DAC 440.

The RF transmitter 410 may also include a timekeeper 460 that may allow the RF transmitter 410 to participate in the transmission rate synchronization process with a data host. In various embodiments, the timekeeper 460 may be a set of executable instructions that process the time request received from a data host, retrieve the DAC clock time, and then generate a time response with the retrieved clock time. The instructions may include a predefined logical function that is executed in response to the RF transmitter 410 receiving a time request, or a thread that may execute continuously on one or more processors of the RF transmitter 410 in the background. The timekeeper 460 may include dedicated processors for executing the instructions related to processing the time request and generating the time response (which may be separate from the other processors of the RF transmitter that handle other operations such as converting digital data to analog signals), or the timekeeper 460 can be a software module that is executed by one or more processors (e.g., a CPU) of the RF transmitter. When the data host transmits a time request to the RF transmitter 410, such as from executing step 302 of method 300, the timekeeper 460 may receive the time request via the network 460 and the network interface 420. In processing the time request, the timekeeper 460 may note the clock time of the RF transmitter's clock associated with when the RF transmitter 410 received the time request and also generate a corresponding time response with the noted clock time. As described above, the RF transmitter's clock may be the clock 450 associated with the DAC 440, so the clock time that the timekeeper 460 includes in the time response may be the DAC clock time retrieved from the DAC 440. The specific clock time that the timekeeper 460 includes in the time response may correspond to various specific times associated with when the time request was received. For example, the clock time included in the time response may be when the network interface 420 received the time request, when the timekeeper 460 received the time request from the network interface 420, when the timekeeper 460 finished processing the time request and generated the time response, or when the network interface 420 transmitted the time response back to the data host, among many other potential points in the process between the time request arriving at the RF transmitter 410 and the time response being transmitted from the RF transmitter 410. That is, the clock times at any of those various points may be viable to include in the time response as the difference in the clock times between those points may be on a small enough scale as to not have a significant effect on the transmission rate synchronization process.

Figure 5:
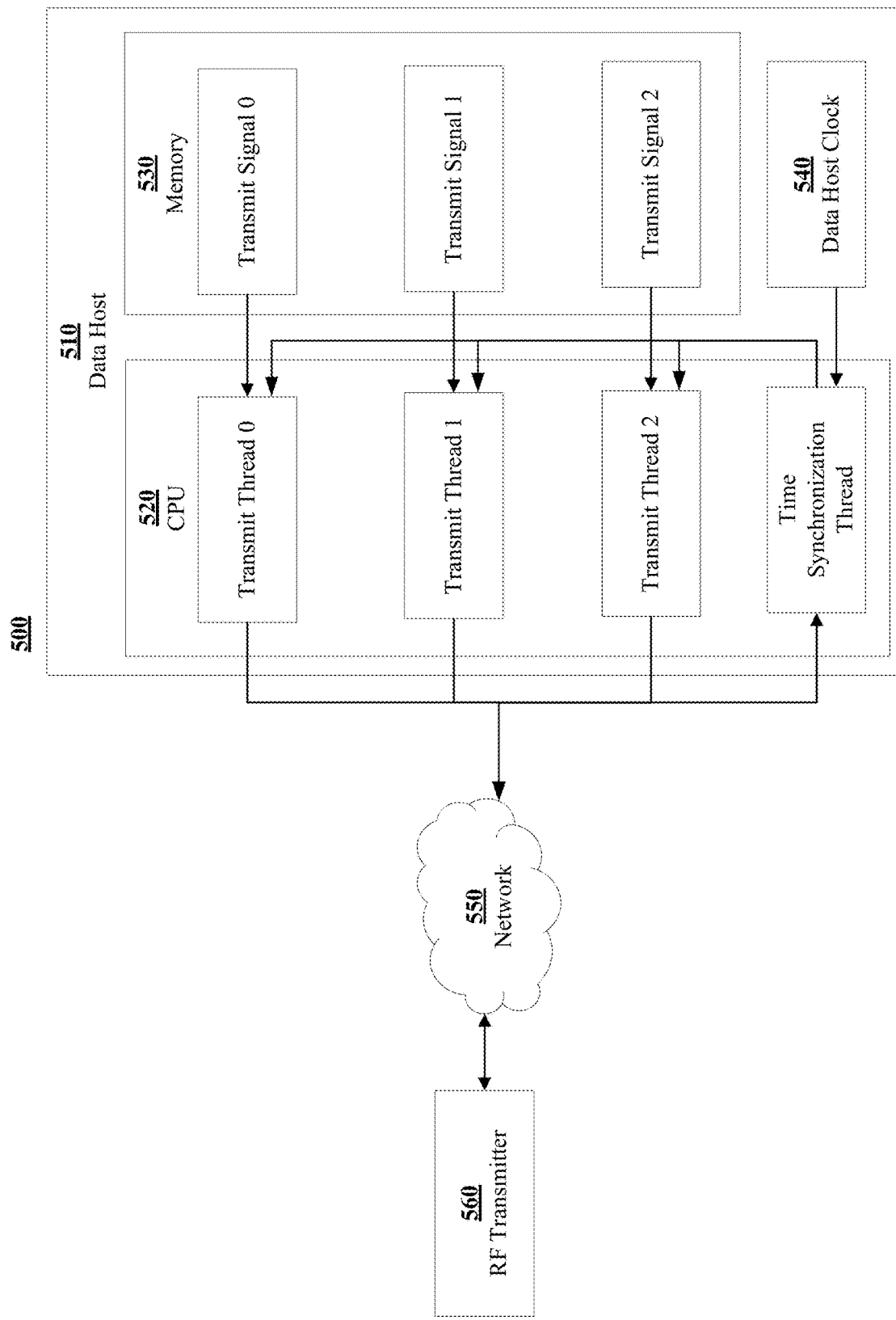
FIG. 5 illustrates a system schematic of an exemplary data host.

FIG. 5 illustrates a system schematic 500 of an exemplary data host 510. The data host 510 may include a central processing unit (CPU) 520 that performs the various operations associated with synchronizing the transmission rates and transmitting data between the data host 510 and a RF transmitter 560, which may correspond to the RF transmitter 410 of FIG. 4 or the RF transmitter 250 of FIG. 2. The CPU 520 may include various transmit threads (e.g., transmit thread 0, transmit thread 1, and transmit thread 2) that may be configured to transmit data to the RF transmitter 560. The CPU 520 may communicate with a memory 530 which may include the data (e.g., transmit signal 0, transmit signal 1, and transmit signal 2) that the transmit threads of the CPU 520 may transmit to the RF transmitter 560 through the network 550. Specifically, each of the transmit threads may be a CPU thread with an independent set of logical instructions executable by the CPU 520 to retrieve data (corresponding to transmit signals 0 through 2) from the memory 530 and transmit the data over the network 550. The network 550 may also correspond to the network 460 of FIG. 4, and thus may also be a 100 Gb Ethernet network. In various embodiments, the data that the transmit threads of the CPU 520 transmit to the RF transmitter 560 may be received from various sensors that detect or generate that data, so the data host 510 may also include or be communicatively coupled to various sensors.

The CPU 520 may include a time synchronization thread that may be configured to perform the various operations associated with synchronizing the transmission rates. The time synchronization thread may be a CPU thread with an independent set of logical instructions executable by the CPU 520 to perform the operations for synchronizing the transmission rates between the data host 510 and the RF transmitter 560. The time synchronization thread may be configured to transmit time requests to the RF transmitter 560 (corresponding to step 302 of method 300), receive the time responses from the RF transmitter 560 (corresponding to step 304 of method 300), generate the operating clock ratios between the clocks of the data host 510 and the RF transmitter 560 (corresponding to step 306 of method 300), and generate the estimates of the RF transmitter clock's clock times (corresponding to step 308 of method 300). The time synchronization thread may also constantly execute alongside or in the background of the transmit threads to continuously update the transmission rate of the data host 510 to help maintain transmission rate synchronization with the RF transmitter 560. To that end, the time synchronization thread may be configured to automatically send time requests, and execute the corresponding processing upon receiving a time response, at predetermined time intervals, such as every second. After executing the steps to determine a transmission rate for the data host 510 that would be synchronized with the transmission rate of the RF transmitter 560, the time synchronization thread may have information on a given amount of time to use to transmit a given amount of data with respect to the data host's clock which may correspond with the amount of time that the RF transmitter 560 would take to transmit that data with respect to the RF transmitter's clock. The time synchronization thread may then notify the transmit threads to retrieve the given amount of data from the transmit signals and transmit the data in the given amount of time. The data host may also include a data host clock 540 which may store the clock time for the data host 510. The time synchronization thread accesses the data host clock 540 to track the clock times associated with transmitting the time request and receiving a corresponding time response.

Figure 6:
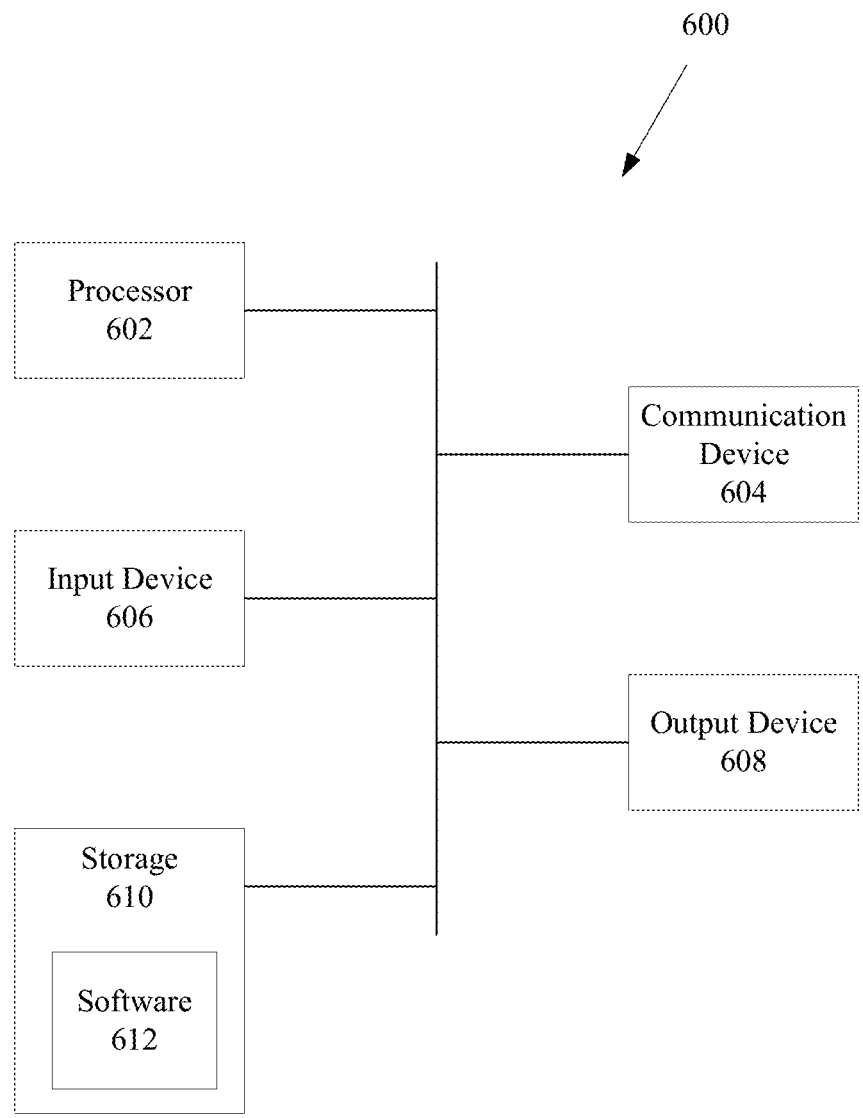
FIG. 6 illustrates an example computer system.

FIG. 6 illustrates an example of a computing system 600, in accordance with one or more examples of the disclosure. Computing system 600 can be a computer connected to a network. Computing system 600 can be a client computer or a server. As shown in FIG. 6, computing system 600 can be any suitable type of microprocessor-based device, such as a personal computer, workstation, server, or handheld computing device (portable electronic device) such as a phone or tablet, or dedicated device. The computing system can include, for example, one or more of processors 602, input device 606, output device 608, storage 610, and communication device 604. Input device 606 and output device 608 can generally correspond to those described above and can either be connectable or integrated with the computer.

Input device 606 can be any suitable device that provides input, such as a touch screen, keyboard or keypad, mouse, or voice-recognition device. Output device 608 can be any suitable device that provides output, such as a touch screen, haptics device, or speaker.

Storage 610 can be any suitable device that provides storage, such as an electrical, magnetic, or optical memory, including a RAM, cache, hard drive, removable storage disk, or other non-transitory computer readable medium. Communication device 604 can include any suitable device capable of transmitting and receiving signals over a network, such as a network interface chip or device. The components of the computing system can be connected in any suitable manner, such as via a physical bus or wirelessly.

Processor(s) 602 can be any suitable processor or combination of processors, including any of, or any combination of, a central processing unit (CPU), field-programmable gate array (FPGA), and application-specific integrated circuit (ASIC). Software 612, which can be stored in storage 610 and executed by processor 602, can include, for example, the programming that embodies the functionality of the present disclosure (e.g., as embodied in the devices as described above).

Software 612 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 610, that can contain or store programming for use by or in connection with an instruction execution system, apparatus, or device.

Software 612 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computing system 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing system 600 can implement any operating system suitable for operating on the network. Software 612 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the endoscope of the disclosure and examples as defined by the claims. Finally, the entire disclosure of the patents and publications referred to in this application are hereby incorporated herein by reference.

The invention claimed is:

1. A method for synchronizing data transmission rates of a data host and a radio frequency (RF) transmitter, comprising:
   transmitting a time request from the data host at a first time of a data host clock to the RF transmitter;
   receiving, by the data host, a time response from the RF transmitter comprising a first time of a RF transmitter clock associated with when the RF transmitter received the time request,
wherein the time response is received by the data host at a second time of the data host clock;
   generating, by the data host, an operating clock ratio between the data host clock and the RF transmitter clock based on the first time of the data host clock and the first time of the RF transmitter clock;
   generating, by the data host, an estimate of a second clock time of the RF transmitter clock based on the operating clock ratio; and
   transmitting data from the data host to the RF transmitter at a data transmission rate,
wherein the data transmission rate is based on the estimate of the second clock time of the RF transmitter clock.

2. The method of claim 1, wherein the operating clock ratio is generated based on at least two instances of the first time of the data host clock and at least two instances of the first time of the RF transmitter clock.

3. The method of claim 1, wherein the operating clock ratio is an average of multiple clock ratios, wherein each of the one or more clock ratios is computed based on at least one instance of the first time of the data host clock and at least one instance of the first time of the RF transmitter clock.

4. The method of claim 3, wherein the at least one instance of the first time of the data host clock and the at least one instance of the first time of the RF transmitter clock are obtained by repeating the steps of transmitting the time request and receiving the time response at a predetermined time interval.

5. The method of claim 1, wherein the RF transmitter stores a true clock time of the RF transmitter clock in memory.

6. The method of claim 5, wherein the true clock time of the RF transmitter clock is a count of a number of clock cycles of the RF transmitter clock.

7. The method of claim 1, wherein the RF transmitter comprises a memory buffer for receiving the data transmitted from the data host.

8. The method of claim 7, wherein the memory buffer is integrated as part of one or more processors of the RF transmitter.

9. The method of claim 1, wherein the data host comprises a thread executing on a processor for transmitting the time request, receiving the time response, and generating the estimate of the second clock time of the RF transmitter clock.

10. The method of claim 1, wherein generating the estimate of the second clock time of the RF transmitter clock is further based on the first time of the RF transmitter clock and the first time of the data host clock.

11. The method of claim 1, wherein the data host comprises a central processing unit (CPU), a graphics processing unit (GPU), or a field-programmable gate array (FPGA).

12. The method of claim 1, wherein the RF transmitter comprises a digital-to-analog converter, a network interface, or a combination thereof.

13. The method of claim 12, wherein the RF transmitter clock is a clock of the digital-to-analog converter.

14. The method of claim 1, wherein the RF transmitter comprises a system in package (SiP), a system on chip (SoC), or a field-programmable gate array (FPGA).

15. The method of claim 1, wherein the data is transmitted from the data host to the RF transmitter via an ethernet connection.

16. The method of claim 15, wherein the ethernet connection is a 100 gigabit ethernet connection.

17. A data host system for synchronizing data transmission rates with a radio frequency (RF) transmitter, comprising:
   a data host clock;
   one or more processors; and
   a memory coupled to the one or more processors comprising instructions executable by the processors, the processors being operable when executing the instructions to:
      transmit a time request at a first time of the data host clock to the RF transmitter;
      receive a time response from the RF transmitter comprising a first time of a RF transmitter clock associated with when the RF transmitter received the time request, wherein the time response is received at a second time of the data host clock;
      generate an operating clock ratio between the data host clock and the RF transmitter clock based on the first time of the data host clock and the first time of the RF transmitter clock;
      generate an estimate of a second clock time of the RF transmitter clock based on the operating clock ratio; and transmit data to the RF transmitter at a data transmission rate, wherein the data transmission rate is based on the estimate of the second clock time of the RF transmitter clock.

18. The data host system of claim 17, wherein the operating clock ratio is generated based on at least two instances of the first time of the data host clock and at least two instances of the first time of the RF transmitter clock.

19. The data host system of claim 17, wherein the operating clock ratio is an average of one or more clock ratios, wherein each of the one or more clock ratios is computed based on at least one instance of the first time of the data host clock and at least one instance of the first time of the RF transmitter clock.

20. The data host system of claim 17, wherein the RF transmitter comprises a memory buffer for receiving the data transmitted from the data host, wherein the memory buffer is integrated as part of one or more processors of the RF transmitter.

21. One or more computer-readable non-transitory storage media embodying software for synchronizing data transmission rates of a data host and a radio frequency (RF) transmitter, the software comprising instructions operable when executed to:
transmit a time request from the data host at a first time of a data host clock to the RF transmitter;
receive a time response from the RF transmitter comprising a first time of a RF transmitter clock associated with when the RF transmitter received the time request, wherein the time response is received at a second time of the data host clock;
generate an operating clock ratio between the data host clock and the RF transmitter clock based on the first time of the data host clock and the first time of the RF transmitter clock;
generate an estimate of a second clock time of the RF transmitter clock based on the operating clock ratio; and
transmit data to the RF transmitter at a data transmission rate, wherein the data transmission rate is based on the estimate of the second clock time of the RF transmitter clock.

22. The computer-readable non-transitory storage media of claim 21, wherein the operating clock ratio is generated based on at least two instances of the first time of the data host clock and at least two instances of the first time of the RF transmitter clock.

23. The computer-readable non-transitory storage media of claim 21, wherein the operating clock ratio is an average of one or more clock ratios, wherein each of the one or more clock ratios is computed based on at least one instance of the first time of the data host clock and at least one instance of the first time of the RF transmitter clock.

* * * * *